US006839618B2

(12) United States Patent
Matsuno et al.

(10) Patent No.: US 6,839,618 B2
(45) Date of Patent: Jan. 4, 2005

(54) DRIVING FORCE TRANSMISSION CONTROL SYSTEM FOR AUTOMOTIVE VEHICLE AND THE METHOD THEREOF

(75) Inventors: Koji Matsuno, Tokyo (JP); Takeshi Yoneda, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/365,529

(22) Filed: Feb. 13, 2003

(65) Prior Publication Data

US 2004/0078129 A1 Apr. 22, 2004

(30) Foreign Application Priority Data

Feb. 14, 2002 (JP) ....................................... 2002-037277

(51) Int. Cl.[7] ................................................ G06F 7/00

(52) U.S. Cl. ........................... 701/67; 701/51; 477/169; 477/34

(58) Field of Search ..................... 701/67, 51; 477/169, 477/34; 74/1 R; 475/254

(56) References Cited

U.S. PATENT DOCUMENTS 5,443,427 A * 8/1995 Ataka et al. ................ 475/123
6,317,672 B1 * 11/2001 Kuramoto et al. ............ 701/51
6,588,292 B2 * 7/2003 Yamasaki et al. ............. 74/340
2002/0019293 A1 * 2/2002 Noda et al. ................. 477/169

* cited by examiner

*Primary Examiner*—Thomas G. Black
*Assistant Examiner*—Olga Hernandez
(74) *Attorney, Agent, or Firm*—McGinn & Gibb, PLLC

(57) ABSTRACT

A center differential limiting control unit calculates and sets a vehicle speed, a target difference in a rotational speed between front and rear axle shafts, a control start difference in the rotational speed, and an actual difference in the rotational speed, respectively. Then, when the actual difference is large than the control start difference, it is determined that a front and rear axle shaft control start condition is established, and front and rear axle shaft differential limiting torque is calculated according to the actual difference and the target difference. In contrast, when the actual difference is smaller than the control start difference, it is determined that the front and rear axle shaft control start condition is not established, and an integral term in the front and rear axle shaft limiting torque and control is set to 0. With this operation, the occurrence of unpleasant noises and vibrations due to the stick-slip of a clutch element is prevented by stably transmitting the torque by using only a state of engagement in a coefficient of dynamic friction by preventing the clutch element from being locked in a coefficient of static friction as much as possible.

13 Claims, 9 Drawing Sheets

CENTER DIFFERENTIAL CLUTCH DRIVE UNIT
REAR DIFFERENTIAL CLUTCH DRIVE UNIT
FRONT DIFFERENTIAL CLUTCH DRIVE UNIT
CENTER DIFFERENTIAL LIMITING CONTROL UNIT
REAR DIFFERENTIAL LIMITING CONTROL UNIT
FRONT DIFFERENTIAL LIMITING CONTROL UNIT

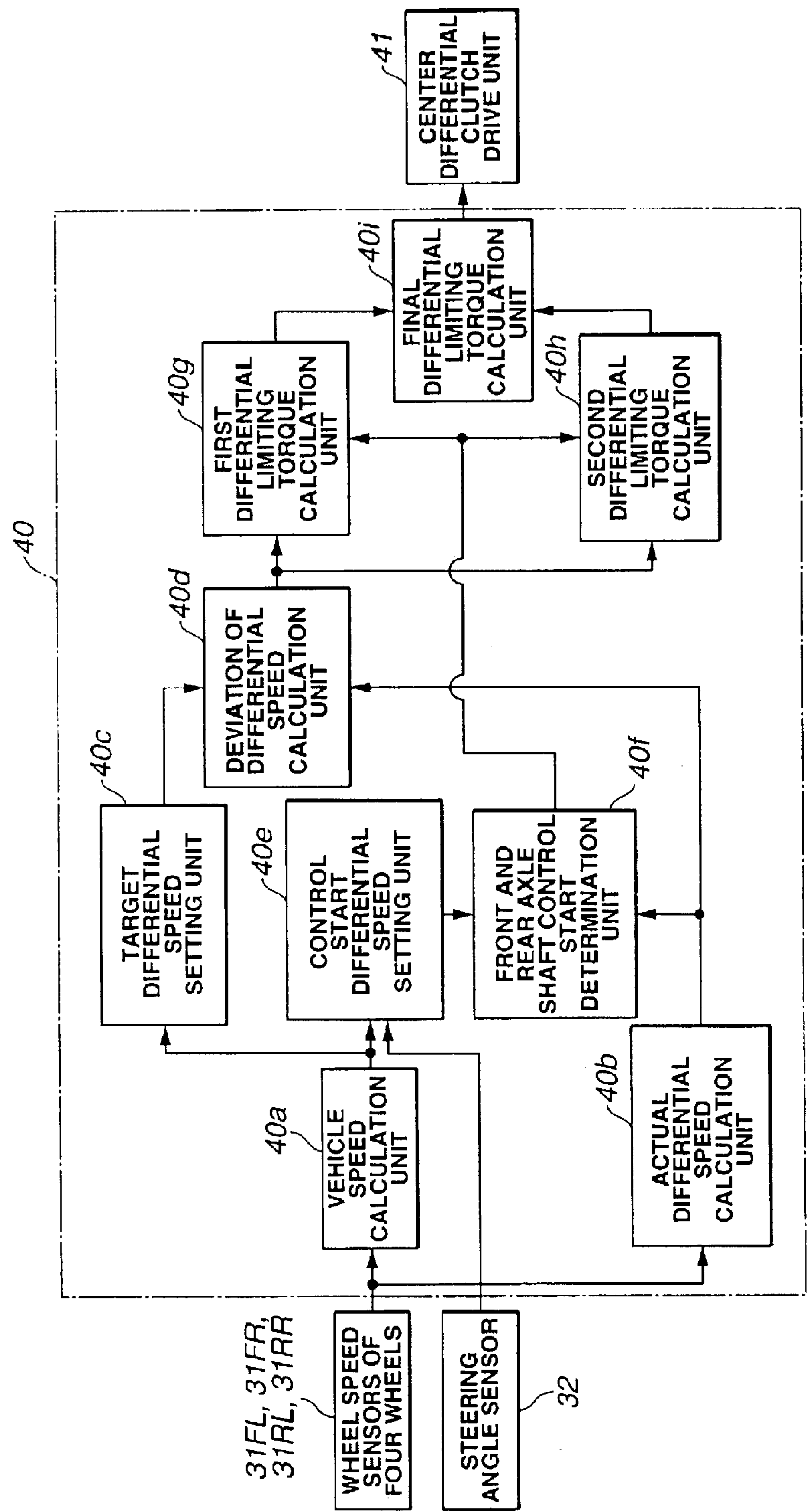
FIG.2
40
31FL, 31FR, 31RL, 31RR
WHEEL SPEED SENSORS OF FOUR WHEELS
32
STEERING ANGLE SENSOR
40a
VEHICLE SPEED CALCULATION UNIT
40b
ACTUAL DIFFERENTIAL SPEED CALCULATION UNIT
40c
TARGET DIFFERENTIAL SPEED SETTING UNIT
40e
CONTROL START DIFFERENTIAL SPEED SETTING UNIT
40f
FRONT AND REAR AXLE SHAFT CONTROL START DETERMINATION UNIT
40d
DEVIATION OF DIFFERENTIAL SPEED CALCULATION UNIT
40g
FIRST DIFFERENTIAL LIMITING TORQUE CALCULATION UNIT
40h
SECOND DIFFERENTIAL LIMITING TORQUE CALCULATION UNIT
40i
FINAL DIFFERENTIAL LIMITING TORQUE CALCULATION UNIT
41
CENTER DIFFERENTIAL CLUTCH DRIVE UNIT

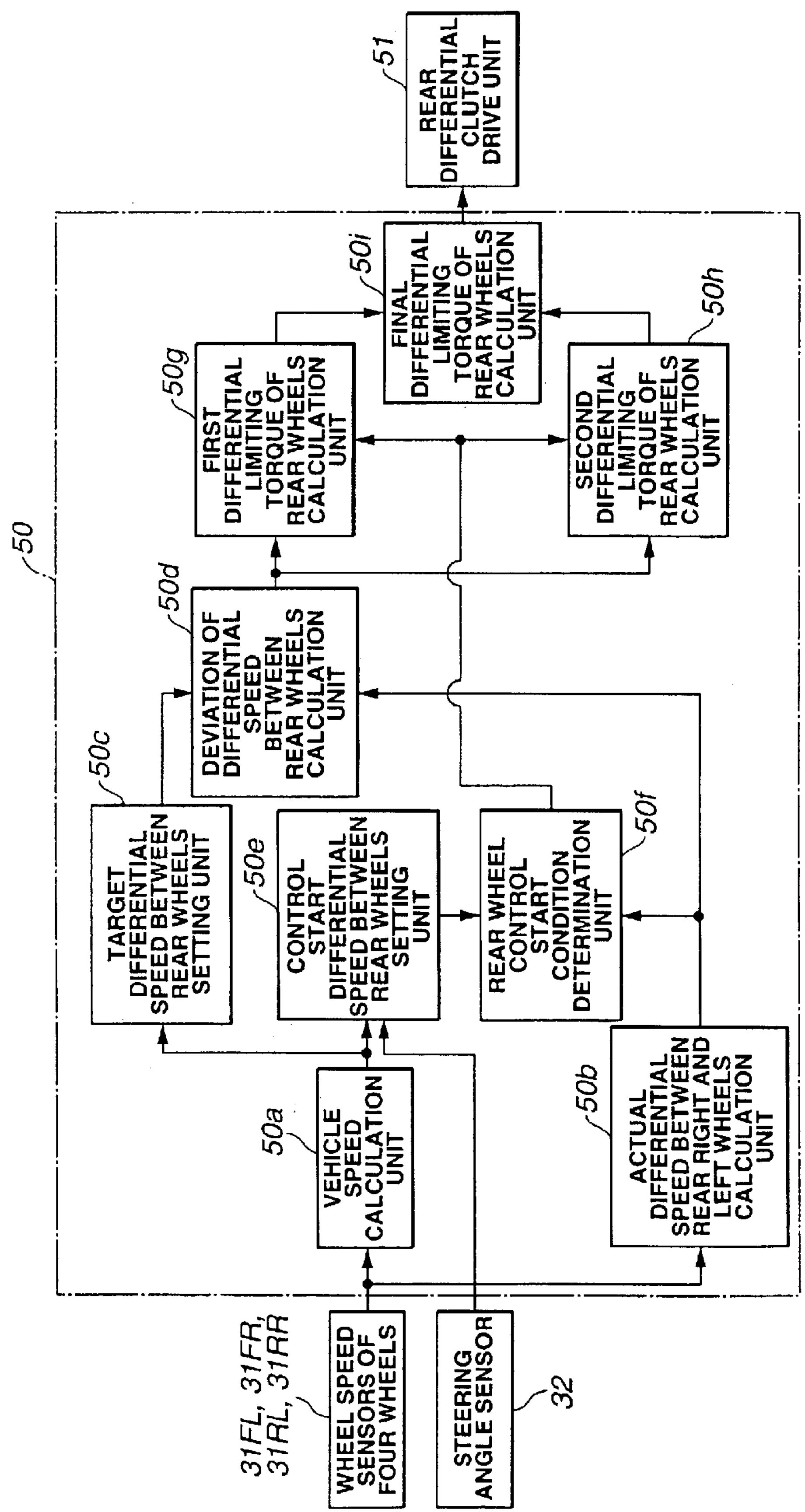
FIG.7
50
WHEEL SPEED SENSORS OF FOUR WHEELS
31FL, 31FR, 31RL, 31RR
STEERING ANGLE SENSOR
32
VEHICLE SPEED CALCULATION UNIT
50a
ACTUAL DIFFERENTIAL SPEED BETWEEN REAR RIGHT AND LEFT WHEELS CALCULATION UNIT
50b
TARGET DIFFERENTIAL SPEED BETWEEN REAR WHEELS SETTING UNIT
50c
CONTROL START DIFFERENTIAL SPEED BETWEEN REAR WHEELS SETTING UNIT
50e
REAR WHEEL CONTROL START CONDITION DETERMINATION UNIT
50f
DEVIATION OF DIFFERENTIAL SPEED BETWEEN REAR WHEELS CALCULATION UNIT
50d
FIRST DIFFERENTIAL LIMITING TORQUE OF REAR WHEELS CALCULATION UNIT
50g
SECOND DIFFERENTIAL LIMITING TORQUE OF REAR WHEELS CALCULATION UNIT
50h
FINAL DIFFERENTIAL LIMITING TORQUE OF REAR WHEELS CALCULATION UNIT
50i
REAR DIFFERENTIAL CLUTCH DRIVE UNIT
51

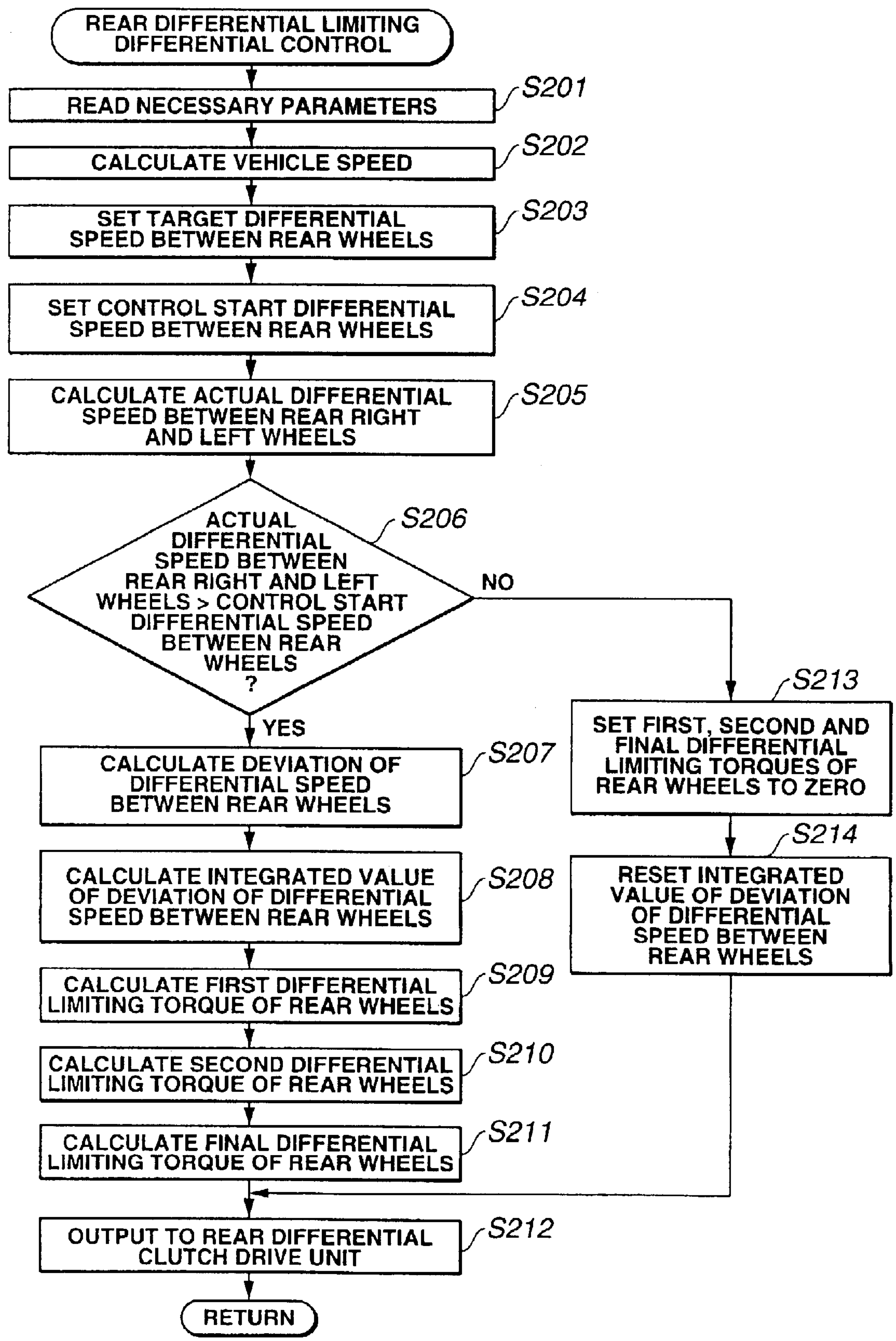
FIG.8
REAR DIFFERENTIAL LIMITING DIFFERENTIAL CONTROL
READ NECESSARY PARAMETERS
S201
CALCULATE VEHICLE SPEED
S202
SET TARGET DIFFERENTIAL SPEED BETWEEN REAR WHEELS
S203
SET CONTROL START DIFFERENTIAL SPEED BETWEEN REAR WHEELS
S204
CALCULATE ACTUAL DIFFERENTIAL SPEED BETWEEN REAR RIGHT AND LEFT WHEELS
S205
ACTUAL DIFFERENTIAL SPEED BETWEEN REAR RIGHT AND LEFT WHEELS > CONTROL START DIFFERENTIAL SPEED BETWEEN REAR WHEELS ?
S206
NO
YES
CALCULATE DEVIATION OF DIFFERENTIAL SPEED BETWEEN REAR WHEELS
S207
CALCULATE INTEGRATED VALUE OF DEVIATION OF DIFFERENTIAL SPEED BETWEEN REAR WHEELS
S208
CALCULATE FIRST DIFFERENTIAL LIMITING TORQUE OF REAR WHEELS
S209
CALCULATE SECOND DIFFERENTIAL LIMITING TORQUE OF REAR WHEELS
S210
CALCULATE FINAL DIFFERENTIAL LIMITING TORQUE OF REAR WHEELS
S211
OUTPUT TO REAR DIFFERENTIAL CLUTCH DRIVE UNIT
S212
RETURN
SET FIRST, SECOND AND FINAL DIFFERENTIAL LIMITING TORQUES OF REAR WHEELS TO ZERO
S213
RESET INTEGRATED VALUE OF DEVIATION OF DIFFERENTIAL SPEED BETWEEN REAR WHEELS
S214

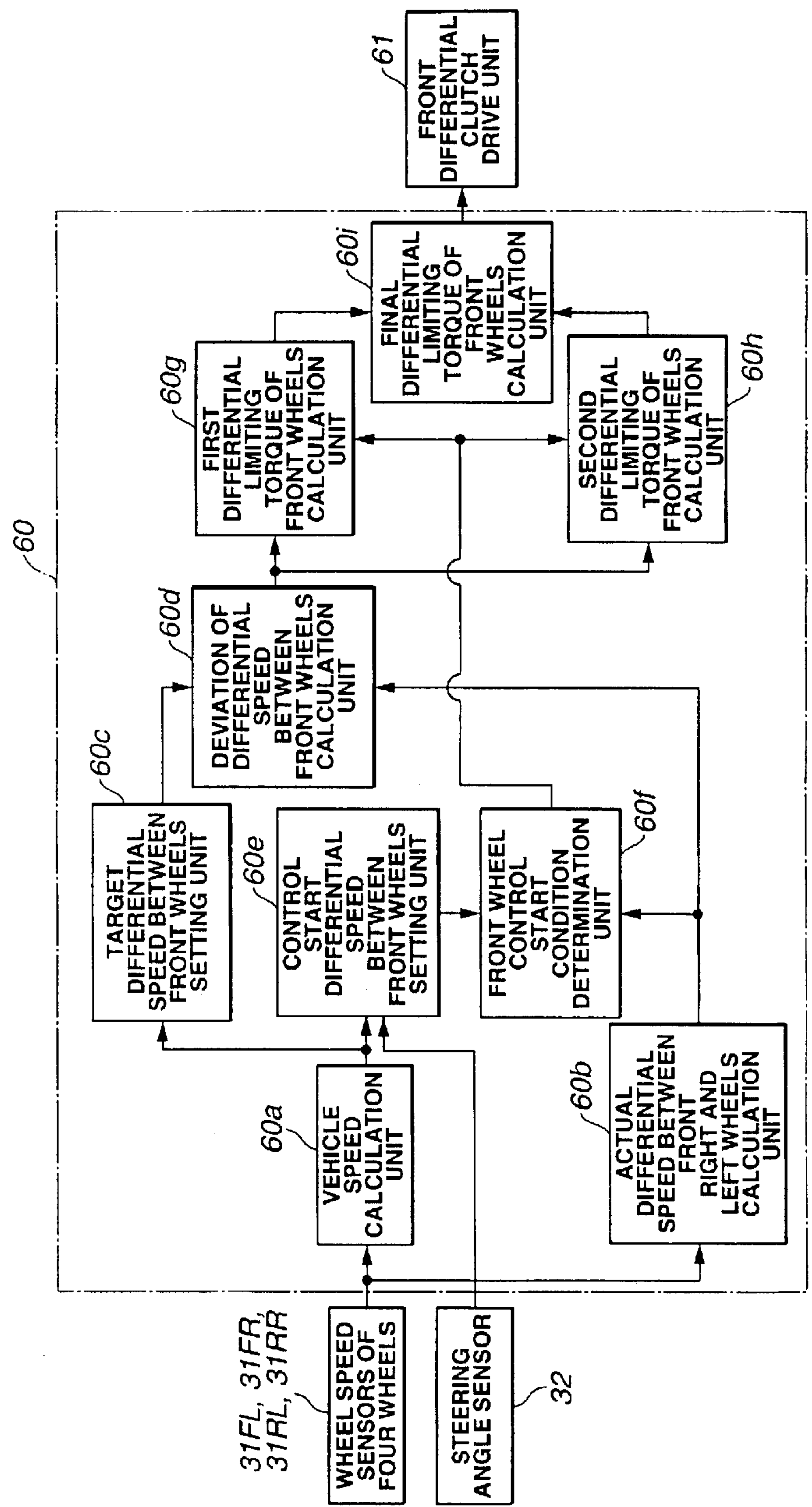
FIG.9
60
WHEEL SPEED SENSORS OF FOUR WHEELS
31FL, 31FR, 31RL, 31RR
STEERING ANGLE SENSOR
32
VEHICLE SPEED CALCULATION UNIT
60a
ACTUAL DIFFERENTIAL SPEED BETWEEN FRONT RIGHT AND LEFT WHEELS CALCULATION UNIT
60b
TARGET DIFFERENTIAL SPEED BETWEEN FRONT WHEELS SETTING UNIT
60c
CONTROL START DIFFERENTIAL SPEED BETWEEN FRONT WHEELS SETTING UNIT
60e
FRONT WHEEL CONTROL START CONDITION DETERMINATION UNIT
60f
DEVIATION OF DIFFERENTIAL SPEED BETWEEN FRONT WHEELS CALCULATION UNIT
60d
FIRST DIFFERENTIAL LIMITING TORQUE OF FRONT WHEELS CALCULATION UNIT
60g
SECOND DIFFERENTIAL LIMITING TORQUE OF FRONT WHEELS CALCULATION UNIT
60h
FINAL DIFFERENTIAL LIMITING TORQUE OF FRONT WHEELS CALCULATION UNIT
60i
FRONT DIFFERENTIAL CLUTCH DRIVE UNIT
61

DRIVING FORCE TRANSMISSION CONTROL SYSTEM FOR AUTOMOTIVE VEHICLE AND THE METHOD THEREOF

The disclosure of Japanese Patent Application No. 2002-37277 filed on Feb. 14, 2002 including the specification, drawings and abstract is incorporated herein by reference in its entirety.

BACKGROUND OF THE INVENTION

1. Field of the Invention

The present invention relates to a driving force transmission control system for transmitting a driving force from one of drive shafts to the other thereof through a transfer clutch, a limited slip differential clutch, and the like which can be optionally connected and disconnected.

2. Description of Related Art

In four-wheel-drive automotive vehicles, the driving force transmitted to front and rear drive shafts and a limited slip differential between front and rear wheels or between right and left wheels are generally controlled by controlling a clutch engaging force of a hydraulic multiple disc clutch and the like.

In the transmission of the driving force as described above, when the clutch engaging force is applied according to a difference between rotational speeds in order to suppress an excessive differential, noise and vibration may be arisen by a stick-slip of the clutch (repetition of a lock state and a slip state of the clutch caused by the difference between a static friction caused when two surfaces of the clutch is stuck to each other and a dynamic friction caused when the two surfaces slip therebetween) if the difference between the rotational speeds is fluctuated by a delay in a control system.

To solve this problem, Japanese Unexamined Utility Model Application Publication No. 5-8097, for example, discloses a technology for mechanically reducing an occurrence of the stick-slip by freely and movably interposing an intermediate member between clutch discs of a clutch constituting a limited slip differential unit.

However, the difference between a coefficient of the static friction and the coefficient of the dynamic friction inevitably exists as long as a friction element typically represented by the clutch is employed, and it is difficult to perfectly prevent the stick-slip by the conventional technology described above.

It is also possible to improve the difference between the coefficient of the static friction and the coefficient of the dynamic friction by a lubricant. However, the lubricant capable of reducing the stick-slip is not always applied in view of other requirements such as the lubrication of gears, and the like.

Further, when the stick-slip is arisen in the clutch and the clutch is in a lock state (in an engagement state of a static frictional coefficient), an indicated control value for engaging the clutch must be largely reduced to permit the clutch to slip again (to shift the clutch to a state in which it is engaged in dynamic frictional coefficient state). In this case, however, the state in which a difference between rotational speeds is smaller than a target value is continued for an abnormally long period of time in a control system. At this time, particularly when the control system has an integral term (past records of control value deviations), the integral term is set to an abnormally small value. Thus, a problem is arisen in that a delay in the control system increases when the clutch begins to actually slip with a result that the stick-slip of the clutch is promoted.

Accordingly, an object of the present invention, which was made in view of the above circumstances, is to provide a driving force transmission control system for an automotive vehicle capable of preventing the occurrence of unpleasant noises and vibrations due to the stick-slip of a clutch element by stably transmitting a torque only in a state of the engagement of the clutch element in the dynamic frictional coefficient state by preventing the clutch element from being locked in the static frictional coefficient state as much as possible even if a delay is caused in the control system.

SUMMARY OF THE INVENTION

A driving force transmission control system for an automotive vehicle for transmitting a driving force from one of drive shafts to the other thereof through clutch means comprises means for setting a target difference in a rotational speed between a drive shaft and another drive shaft according to traveling states of the automotive vehicle, first means for detecting an actual difference in rotational speed between the one drive shaft and the other drive shaft, second means for setting a lower limit value of the difference in the rotational speed between the drive shafts, and differential limiting torque setting means for calculating an engaging torque of the clutch means according to a target difference in the rotational speed and the actual difference in the rotational speed and for setting the engaging torque of the clutch means to approximately 0 when at least the actual difference in the rotational speed is smaller than the lower limit value of the difference in the rotational speed.

The above and other objects, features and advantages of the present invention will become more clearly understood from the following description referring to the accompanying drawings.

BRIEF DESCRIPTION OF THE DRAWINGS

FIG. 2 is a functional block diagram of a center differential limiting control unit;

FIG. 7 is the function block diagram of a rear differential limiting control unit;

FIG. 8 is the flowchart of a rear differential limiting control program;

FIG. 9 is the function block diagram of a front differential limiting control unit.

DESCRIPTION OF THE PREFERRED EMBODIMENTS

An embodiment of the present invention will be described below with reference to FIGS. 1 to 10.

Figure 1:
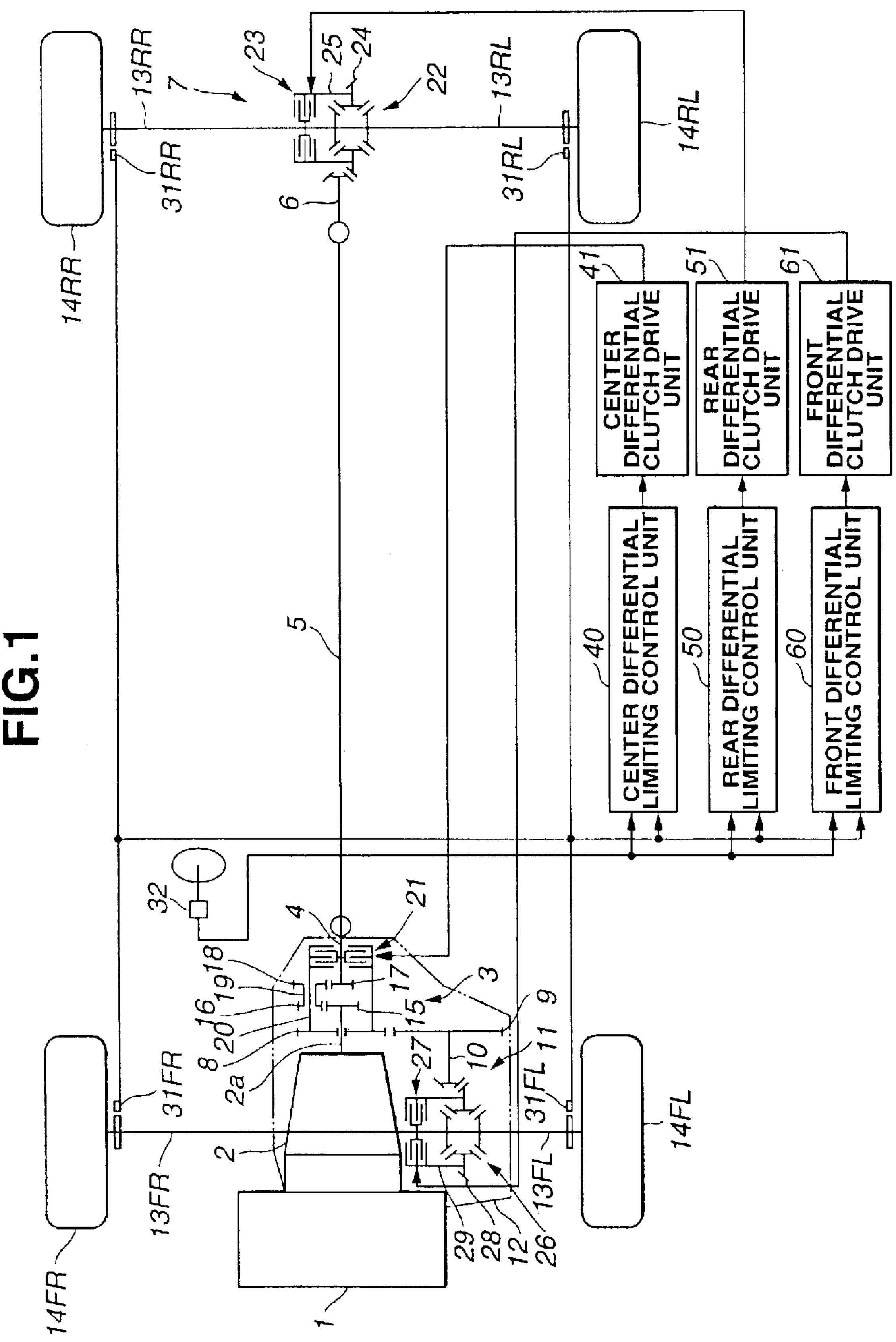
FIG. 1 is a view schematically explaining a drive train and the respective driving force transmitting control system of an automotive vehicle.

In FIG. 1, an engine 1 is mounted on a front side of an automotive vehicle. A driving force generated by the engine 1 is transmitted from an automatic transmission 2 (illustrated together with a torque converter and the like) on a rear side of the engine 1 to a center differential unit 3 through a transmission output shaft 2*a*. On a rear wheel side from the center differential unit 3, the driving force is transmitted to a rear wheel final reduction gear 7 via a rear drive shaft 4, a propeller shaft 5 and a drive pinion 6. On the other hand, on a front wheel side, the driving force is transmitted to a front wheel final reduction gear 11 via a transfer drive gear 8, a transfer driven gear 9 and a front drive shaft (i.e., a drive pinion shaft) 10. Here, arranged within a casing 12 together are the automatic transmission 2, the center differential unit 3 and the front wheel final reduction gear 11 all.

The driving force inputted to the rear wheel final reduction gear 7 is transmitted to a rear left wheel 14RL via a rear left axle shaft 13RL and to a rear right wheel 14RR via a rear wheel right axle shaft 13RR. On the other hand, the driving force inputted to the front wheel final reduction gear 11 is transmitted to a front left wheel 14FL via a front left axle shaft 13FL and to a front right wheel 14FR through a front right axle shaft 13FR.

The center differential unit 3 is arranged such that a first sun gear 15 having a large diameter is formed on the transmission output shaft 2*a* on an input side, and the first sun gear 15 is meshed with a first pinion 16 having a small diameter to thereby arrange a first gear train.

A second sun gear 17 having a small diameter is formed on the rear drive shaft 4 for outputting the driving force to the rear wheels 14RL, 14RR, and the second sun gear 17 is meshed with a second pinion 18 having a large diameter to thereby arrange a second gear train.

The first and second pinions 16 and 18 are formed on each of a plurality (for example, three sets) of pinion members 19 integrally therewith, and the plurality of pinion members 19 are rotatably supported by a fixed shaft attached to a carrier 20. Then, the transfer drive gear 8 is coupled with the carrier 20 at the front end thereof so as to output the driving force to the front wheels 14FL, 14FR.

Further, the transmission output shaft 2*a* is rotatably inserted into the carrier 20 from the front side thereof, and the rear drive shaft 4 is rotatably inserted into the carrier 20 from the rear side thereof. The first and second sun gears 15 and 17 are accommodated in a space of the carrier 20 at the center thereof. The first pinions 16 of the plurality of pinion members 19 are meshed with the first sun gear 15 and the second pinions 18 thereof are meshed with second sun gear 17.

Thus, a compound planetary gear system without a ring gear is structured by such a meshing arrangement that one of the output sides is provided via the first and second pinions 16 and 18 and the second sun gear 17 with respect to the first sun gear 15 on the input side, and the other of the output sides is provided via the carrier 20 of the first and second pinions 16 and 18 with respect to the first sun gear 15.

The center differential unit 3 of a compound planetary gear type is provided with a differential function by appropriately setting the number of teeth of the first and second sun gears 15 and 17 and the number of teeth of the plurality of first and second pinions 16 and 18 disposed around the first and second sun gears 15 and 17.

Further, a standard torque distribution is set to a desired distribution (for example, unequal torque distribution in which the torque is mainly distributed to the rear wheels) by appropriately setting the radius of pitch at which the first and second pinions 16 and 18 are meshed with the first and second sun gears 15 and 17.

In the center differential unit 3, the first and second sun gears 15 and 17 and the first and second pinions 16 and 18 are composed of, for example, helical gears and the helix angle of the first gear train is set different from that of the second gear train so that thrust loads remain without being canceled. Further, a friction torque is generated at both the ends of the pinion members 19 such that the resultant force of separation and tangential loads is obtained by a surface mesh of the first and second pinions 16 and 18 with the fixed shaft attached to the carrier 20. Thus, the center differential unit 3 can be provided with differential limiting function by itself by obtaining a differential limiting torque proportional to an input torque.

Further, a center differential clutch (transfer clutch) 21, i.e. clutch means composed of a hydraulic multiple disc clutch is interposed between the two output members of the center differential unit 3, that is, between the carrier 20 and the rear drive shaft 4 to variably distribute the driving force between the front and rear wheels 14FR, 14FL, 14RR, and 14RL. A torque can be variably distributed to the front and rear wheels 14FR, 14FL, 14RR, and 14RL in the range of from front wheel 50: rear wheels 50 (4WD by direct coupling) to a ratio distributed by the center differential unit 3 (for example, front wheels 35:rear wheels 65) by controlling the engaging force of the transfer clutch 21.

The transfer clutch 21 is connected to a center differential clutch drive unit 41 composed of a hydraulic circuit having a plurality of solenoid valves and engaged and disengaged by the hydraulic pressure generated by the center differential clutch drive unit 41. A control signal (a signal supplied to the respective solenoid valves) for driving the drive unit 41 is supplied from a center differential limiting control unit 40 which will be described later.

In contrast, the rear wheel final reduction gear 7 is composed of a bevel gear type differential mechanism 22 and a rear differential clutch 23, i.e. a first clutch means composed of a hydraulic multiple disc clutch likewise for limiting a differential action between the right and left wheels.

The rear differential clutch 23 is interposed between a differential case 25 to which a ring gear 24 meshed with the drive pinion 6 is fixed and the rear right axle shaft 13RR and connected to a rear differential clutch drive unit 51 composed of a hydraulic circuit having a plurality of solenoid valves. The rear differential clutch 23 is engaged and disengaged by the hydraulic pressure generated by the rear differential clutch drive unit 51. A control signal (the signal supplied to the respective solenoid valves) for driving the drive unit 51 is supplied from a rear differential limiting control unit 50 which will be described later.

The front final reduction gear 11 is arranged approximately similarly to the rear final reduction gear 7 and composed of a bevel gear type differential mechanism 26 and a front differential clutch 27, i.e. a second clutch means composed of a hydraulic multiple disc clutch likewise for limiting the differential action between the right and left wheels.

The front differential clutch 27 is interposed between a differential case 29 to which a ring gear 28 meshed with a drive pinion of the front drive shaft 10 is fixed and the front right axle shaft 13FR and connected to a front differential clutch drive unit 61 composed of a hydraulic circuit having the plurality of the solenoid valves. The front differential clutch 27 is engaged and disengaged by the hydraulic pressure generated by the front differential clutch drive unit 61. The control signal (the signal supplied to the respective solenoid valves) for driving the front drive unit 61 is supplied from a front differential limiting control unit 60 which will be described later.

Necessary parameters are supplied to the center, rear and front differential limiting control units 40, 50, and 60 described above from various sensors as described later.

That is, the wheel speeds of the respective wheels 14FR, 14FL, 14RR and 14RL detected by wheel speed sensors 31FR, 31FL, 31RR, and 31RL are supplied to the center, rear and front differential limiting control units 40, 50, and 60.

Further, the automotive vehicle has a steering angle sensor 32, and a steering angle detected by the steering angle sensor 32 is supplied to the center, rear and front differential limiting control units 40, 50, and 60.

Next, the center, rear and front differential limiting control units 40, 50, and 60 described above will be explained.

The center differential limiting control unit 40 has composed of a microcomputer and its peripheral circuit and mainly includes a vehicle speed calculation unit 40*a*, a calculation unit 40*b* for calculating an actual difference in rotational speeds between front and rear axle shafts, a setting unit 40*c* for setting a target difference in the rotational speed between the front and rear axle shafts, a calculation unit 40*d* for calculating a deviation of differences in the rotational speeds between the front and rear axle shafts, a setting unit 40*e* for setting a control start difference in the rotational speed between the front and rear axle shafts, a determination unit 40*f* for determining a front and rear axle shaft control start condition, a first calculation unit 40*g* for calculating a first differential limiting torque of the front and rear axle shafts, a second calculation unit 40*h* for calculating a second differential limiting torque of the front and rear axle shafts, and a third calculation unit 40*i* for calculating differential limiting torque of the front and rear axle shafts, as shown in FIG. 2.

The vehicle speed calculation unit 40*a* is supplied with the wheel speeds ωfr, ωfl, ωrr, and ωrl of the respective wheels 14FR, 14FL, 14RR, and 14RL from wheel speed sensors for the four wheels, that is, the respective wheel speed sensors 31FR, 31FL, 31RR, and 31RL, calculates the vehicle speed V by calculating, for example, an average value of the wheel speeds, and supplies the vehicle speed V to the setting units 40*c* and 40*e*.

The calculation unit 40*b* is supplied with the wheel speeds ωfr, ωfl, ωrr, and ωrl of the respective wheels 14FR, 14FL, 14RR, and 14RL from the respective wheel speed sensors 31FR, 31FL, 31RR, and 31RL and calculates an actual difference in the rotational speed between the front and rear axle shafts Δωctr by the following equation (1). That is, the calculation unit 40*b* is provided for detecting the actual difference in the rotational speed in a center differential limiting control.

$$\Delta\omega ctr=|((\omega fl+\omega fr)/2)-((\omega rl+\omega rr)/2)| \quad (1)$$

Then, the actual difference in the rotational speed between the front and rear axle shafts Δωctr calculated by the calculation unit 40*b* is supplied to the calculation unit 40*d* and the determination unit 40*f*.

The setting unit 40*c* is supplied with the vehicle speed V from the vehicle speed calculation unit 40*a* and sets a target difference in the rotational speed between the front and rear axle shafts Δωctrt according to the vehicle speed V with reference to the maps of the vehicle speed V and the target difference in rotational speed between the front and rear axle shafts Δωctrt which are previously determined by an experiment, a calculation, and the like.

Figure 3:
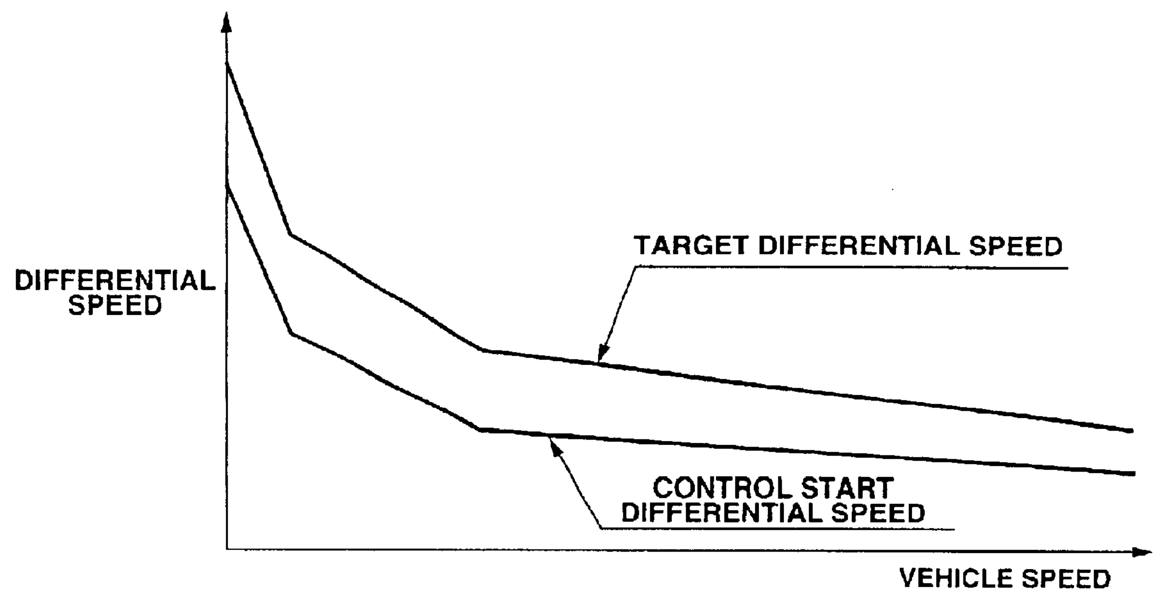
FIG. 3 is a view explaining relationships between a target differential speed and a vehicle speed and between a starting differential speed, and the vehicle speed.
Figure 4:
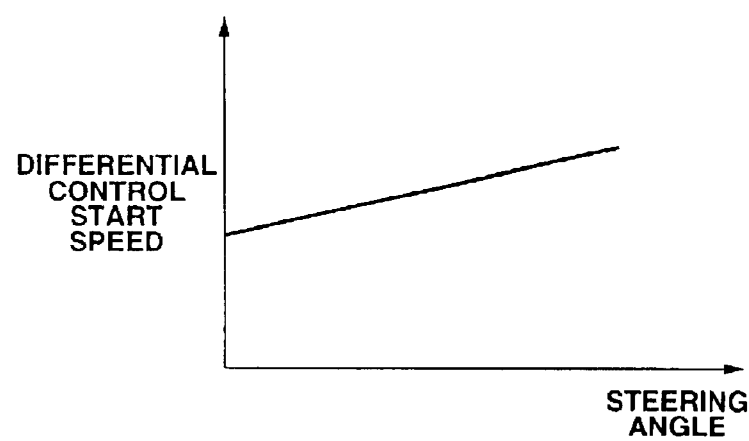
FIG. 4 is the view explaining the relationship between the starting differential speed and a steering angle.

The maps of the vehicle speed V and the target difference in the rotational speed between the front and rear axle shafts Δωctrt are set as shown in, for example, FIG. 3, and the target difference in the rotational speed between the front and rear axle shafts Δωctrt is previously set so as to gradually decrease as the vehicle speed V increases based on specifications and the like of the automotive vehicle in view of various errors arisen in actual runnings.

The target difference in the rotational speed between the front and rear axle shafts Δωctrt set by the setting unit 40*c* is supplied to the calculation unit 40*d*. That is, the setting unit 40*c* is provided for setting the target difference in the rotational speed in the center differential limiting control.

The calculation unit 40*d* is supplied with the actual difference in the rotational speed between the front and rear axle shafts Δωctr from the calculation unit 40*b* and with the target difference in the rotational speed between the front and rear axle shafts Δωctrt from the setting unit 40*c*, and calculates the deviation therebetween (the deviation between the actual and target differences in the rotational speeds Δωctr and Δωctrt, which is hereinafter referred to as "a deviation of the differences in the rotational speed between the front and rear wheels") εctr by the following equation (2). And, the calculation unit 40*d* supplies the deviation to the calculation units 40*g* and 40*h*.

$$\epsilon ctr=\Delta\omega ctr-\Delta\omega ctrt \quad (2)$$

The setting unit 40*e* is supplied with the vehicle speed V from the vehicle speed calculation unit 40*a* and sets the difference in the rotational speed between the front and rear axle shafts for starting the control of the shafts (hereinafter, referred to as "control start difference in the rotational speed between the front and rear axle shafts") Δωctrs according to the vehicle speed V referring to the maps of the vehicle speed V and the control start difference in the rotational speed between the front and rear axle shafts Δωctrs previously determined by, for example, the experiment, the calculation, and the like.

The control start difference in the rotational speed between the front and rear axle shafts Δωctrs is a value smaller than the target difference in the rotational speed between the front and rear axle shafts Δωctrt and set as a lower limit value of the actual difference in the rotational speed between the front and rear axle shafts Δωctr as described below. The maps of the vehicle speed V and the control start difference in the rotational speed between the front and rear axle shafts Δωctrs are set as shown in, for example, FIG. 3, and the control start difference in the rotational speed between the front and rear axle shafts Δωctrs is previously set so as to gradually decrease as the vehicle speed V increases based on the specifications and the like of the automotive vehicle in view of various errors arisen in the actual runnings.

Note that, in this embodiment, the setting unit 40*e* is supplied with the steering angle from the steering angle sensor 32 and can more accurately set the control start difference in the rotational speed between the front and rear axle shafts Δωctrs set according to the vehicle speed V by further correcting thereof by the steering angle. The correction made according to the steering angle is executed by the map having characteristics shown in, for example, FIG. 4, and the control start difference in the rotational speed between the front and rear axle shafts Δωctrs is corrected in a larger amount as the steering angle has a larger value.

Thus, the control start difference in the rotational speed between the front and rear axle shafts Δωctrs set by the setting unit 40*e* is supplied to the determination unit 40*f*.

That is, the setting unit 40*e* is provided for setting the lower limit value of the difference in the rotational speed in the center differential limiting control.

The determination unit 40*f* is supplied with the actual difference in the rotational speed between the front and rear axle shafts Δωctr from the calculation unit 40*b* and with the control start difference in the rotational speed between the front and rear axle shafts Δωctrs from the setting unit 40*e* and determines whether or not a front and rear axle shaft control start condition is established by comparing thereof.

That is, when the actual difference in the rotational speed between the front and rear axle shafts Δωctr is larger than the control start difference in the rotational speed between the front and rear axle shafts Δωctrs, the determination unit 40*f* determines that the control start condition is established and supplies the result of a determination to the calculation units 40*g* and 40*h*.

The calculation unit 40*g* is supplied with the deviation of the differences in the rotational speed between the front and rear wheels εctr from the calculation unit 40*d* and with the result of the determination of the control start condition from the determination unit 40*f* and calculates a first differential limiting torque of the front and rear axle shafts T smcctr as shown, for example, below.

$$s\ ctr = \epsilon ctr + k\ ictr \int(\epsilon ctr)dt \quad (3)$$

(integration is executed from 0 to t)
where, k ictr shows a gain of an integral term.

$$x = k\ wctr \cdot j\ wctr \cdot (d\epsilon ctr/dt) + T\ sgctr \cdot (s\ ctr/(|s\ ctr| + \delta ctr)) \quad (4)$$

where, k wctr shows a gain of a differential term, j wctr shows an inertia term, T sgctr shows a switching gain, and δctr shows a constant for making a differential limiting force continuous to prevent chattering.

When x>0, the first differential limiting torque of the front and rear axle shafts T smcctr is set to x, whereas, when, x<0, it is set to 0. When Δωctr≦Δωctrs is established and the control start condition is not established by referring to the result of the determination of the control start condition supplied from the determination unit 40*f*, T smcctr is set to 0 even if T smcctr=x as well as ∫(εctr)dt=0 is reset (integration is executed from 0 to t).

That is, the actual difference in the rotational speed between the front and rear axle shafts Δωctr is smaller than the control start difference in the rotational speed between the front and rear axle shafts Δωctrs that is the lower limit value, the first differential limiting torque of the front and rear axle shafts T smcctr is is set to 0 to prevent the transfer clutch 21 from being locked by the coefficient of a static friction. Further, the integral term ∫(εctr)dt=0 is reset (the integration is executed from 0 to t) in order to effectively prevent from the integral term of being set to an abnormally low value, the control of the transfer clutch 21 is delayed when it actually begins to slip again, and the stick-slip of the clutch is promoted. The first differential limiting torque of the front and rear axle shafts T smcctr calculated as described above is supplied to the calculation unit 40*i*.

The calculation unit 40*h* is supplied with the deviation of the differences in the rotational speed between the front and rear wheels εctr from the calculation unit 40*d* and with the result of the determination of the control start condition from the determination unit 40*f* and calculates the second differential limiting torque of the front and rear axle shafts T pcctr as described, for example, below.

That is, when the deviation of the differences in the rotational speed between the front and rear wheels εctr is larger than 0, the second differential limiting torque of the front and rear axle shafts T pcctr is set to k pctr·εctr, whereas when it is smaller than 0, the second differential limiting torque of the front and rear axle shafts T pcctr is set to 0. Here, k pctr shows a gain of a proportional term. When Δωctr≦Δωctrs and thus the control start condition is not established by referring to the result of the determination of the control start condition supplied from the determination unit 40*f*, T pcctr is set to 0 even if T pcctr=k pctr·εctr, thereby the transfer clutch 21 is prevented from being locked by the coefficient of the static friction. The second differential limiting torque of the front and rear axle shafts T pcctr calculated as described above is supplied to the calculation unit 40*i*.

The calculation unit 40*i* is supplied with the first differential limiting torque of the front and rear axle shafts T smcctr from the calculation unit 40*g* and with the second differential limiting torque of the front and rear axle shafts T pcctr from the calculation unit 40*h*, calculates a final differential limiting torque of the front and rear axle shafts T lsdctr by the following equation (5), and supplies the indicated value of a differential control force according to the final differential limiting torque of the front and rear axle shafts T lsdctr to the center differential clutch drive unit 41.

$$T\ lsdctr = T\ smcctr + T\ pcctr \quad (5)$$

As described above, in this embodiment, the differential limiting torque setting means is composed of the calculation unit 40*d* for calculating the deviation of the differences in the rotational speed between the front and rear axle shafts, the determination unit 40*f* for determining the front and rear axle shaft control start condition, the first calculation unit 40*g* for calculating the first differential limiting torque of the front and rear axle shafts, the second calculation unit 40*h* for calculating the second differential limiting torque of the front and rear axle shafts, and the third calculation unit 40*i* for calculating the differential limiting torque of the front and rear axle shafts.

Figure 5:
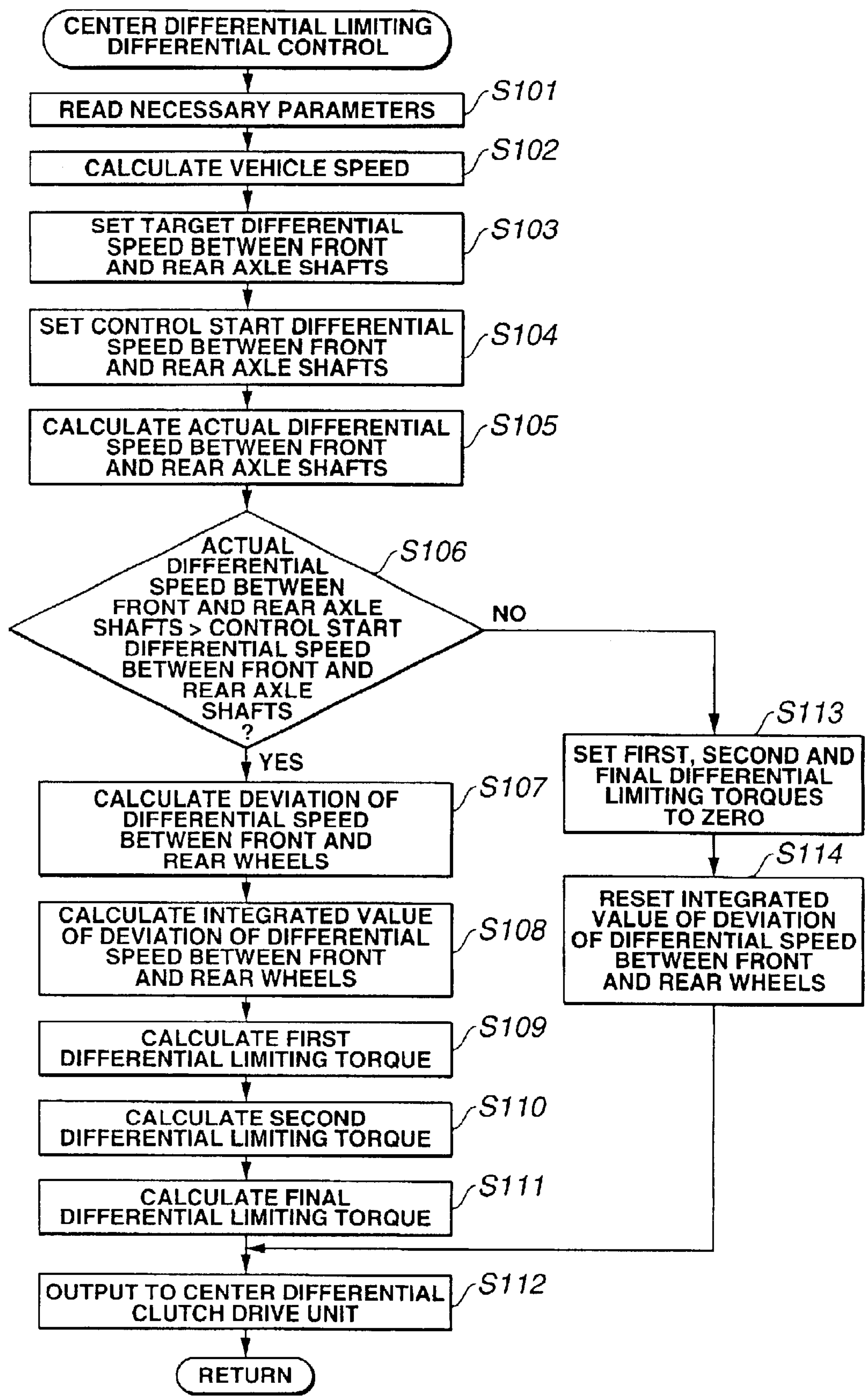
FIG. 5 is a flowchart of a center differential limiting control program.

Next, a flow of processing executed by the center differential limiting control unit 40 will be described with reference to the flowchart of FIG. 5.

First, at step (hereinafter, abbreviated as "S") 101, necessary parameters such as the wheel speeds ωfr, ωfl, ωrr, and ωrl of the respective wheels 14FR, 14FL, 14RR, and 14RL, a steering angle, and the like are read.

Then, the process goes to S102 at which the vehicle speed calculation unit 40*a* calculates the vehicle speed V, and the process goes to S103 at which the setting unit 40*c* sets the target difference in the rotational speed between the front and rear axle shafts Δωctrt according to the vehicle speed V with reference to the maps of the vehicle speed V and the target difference in the rotational speed between the front and rear axle shafts Δωctrt.

Next, the process goes to S104 at which the setting unit 40*e* sets the control start difference in the rotational speed between the front and rear axle shafts Δωctrs with reference to the maps of the vehicle speed V and the target difference in the rotational speed between the front and rear axle shafts Δωctrt by making correction using the steering angle.

Next, the process goes to S105 at which the calculation unit 40*b* calculates the actual difference in the rotational speed between the front and rear axle shafts Δωctr based on the equation (1).

Thereafter, when the process goes to S106, the determination unit 40*f* compares the actual difference in the rotational speed between the front and rear axle shafts Δωctr with the control start difference in the rotational speed between the front and rear axle shafts $\Delta\omega ctrs$. When the actual difference in the rotational speed between the front and rear axle shafts $\Delta\omega ctr$ is larger than the control start difference in the rotational speed between the front and rear axle shafts $\Delta\omega ctrs$, the determination unit 40*f* determines that the front and rear shaft control start condition is established, and the process goes to S107.

At S107, the calculation unit 40*d* calculates the deviation of the differences in the rotational speed between the front and rear wheels $\epsilon ctr$, and the process goes to S108.

At S108, the first calculation unit 40*g* calculates the integrated value of the deviation of the differences in the rotational speed between the front and rear wheels $\epsilon ctr$, that is, calculates $\int(\epsilon ctr)dt=0$ (the integration is executed from 0 to t). Then, the process goes to S109 at which the first calculation unit 40*g* calculates the first differential limiting torque of the front and rear axle shafts T smcctr. The calculation of the first differential limiting torque of the front and rear axle shafts T smcctr depends upon the value of x calculated by the equation (4). When $x>0$, the first differential limiting torque of the front and rear axle shafts T smcctr is set to x, whereas when $x<0$, it is set to 0.

Next, the process goes to S110 at which the second calculation unit 40*h* calculates the second differential limiting torque of the front and rear axle shafts T pcctr. Specifically, when the deviation of the differences in the rotational speed between the front and rear wheels $\epsilon ctr$ is larger than 0, the second differential limiting torque of the front and rear axle shafts T pcctr is set to $k\ pctr \cdot \epsilon ctr$, whereas when it is smaller than 0, the second differential limiting torque of the front and rear axle shafts T pcctr is set to 0.

Next, the process goes to S111 at which the third calculation unit 40*i* calculates the sum of the first differential limiting torque of the front and rear axle shafts T smcctr and the second differential limiting torque of the front and rear axle shafts T pcctr according to the equation (5) and determines the final differential limiting torque of the front and rear axle shafts T lsdctr. Then, the process goes to S112 at which the indicated value of a differential limiting force according to the final differential limiting torque of the front and rear axle shafts T lsdctr is output to the center differential clutch drive unit 41 and a program is finished.

In contrast, when the actual difference in the rotational speed between the front and rear axle shafts $\Delta\omega ctr$ is smaller than the control start difference in the rotational speed between the front and rear axle shafts $\Delta\omega ctrs$ in the determination at S106, it is determined that the front and rear axle shaft control start condition is not established, and the process goes to S113.

At S113, the first differential limiting torque of the front and rear axle shafts T smcctr, the second differential limiting torque of the front and rear axle shafts T pcctr, and the final differential limiting torque of the front and rear axle shafts T lsdctr are set to 0.

Thereafter, the process goes to S114 at which the first calculation unit 40*g* resets the integrated value of the deviation of the differences in the rotational speed between the front and rear wheels $\epsilon ctr$ to 0, and the process goes to S112 and finishes the program.

Figure 6A:
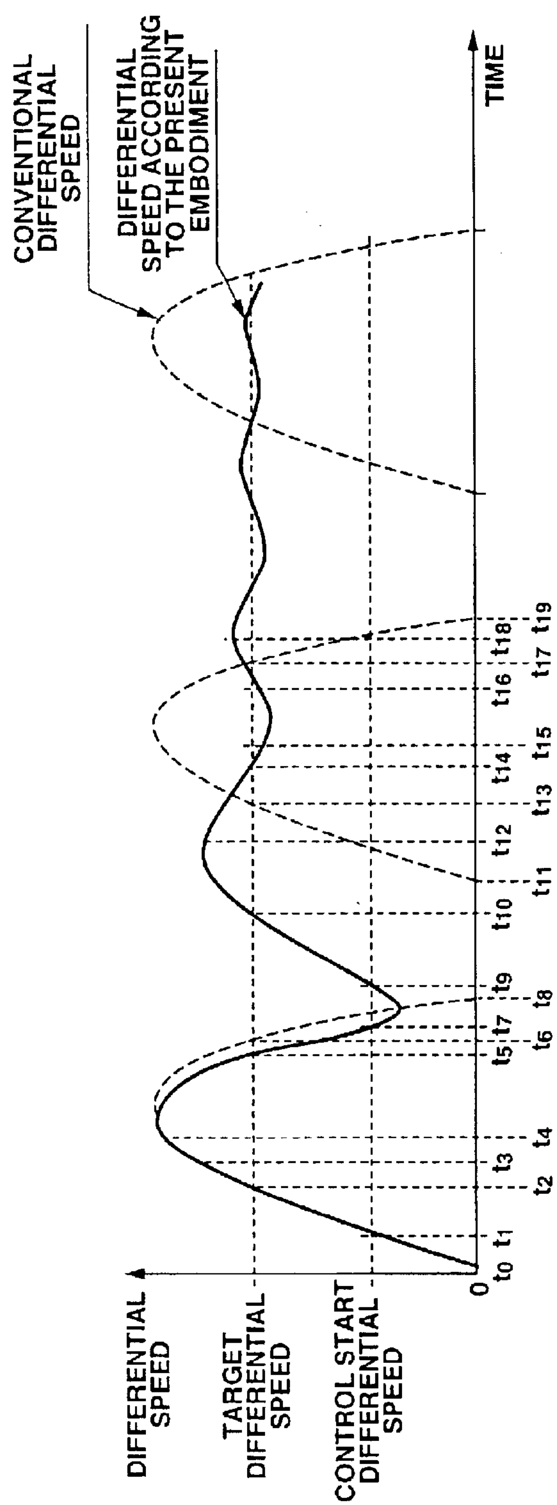
FIG. 6 is a time chart explaining the differential limiting control according to the present invention and a conventional differential limiting control for comparing thereof.

Examples of the target difference in the rotational speed between the front and rear axle shafts $\Delta\omega ctrt$, the control start difference in the rotational speed between the front and rear axle shafts $\Delta\omega ctrs$, and the actual difference in the rotational speed between the front and rear axle shafts $\Delta\omega ctr$ are shown by the time chart of FIG. 6A. Note that broken (dashed) lines in FIG. 6A show an example of the actual difference in the rotational speed between the front and rear axle shafts according to a conventional control.

Figure 6B:
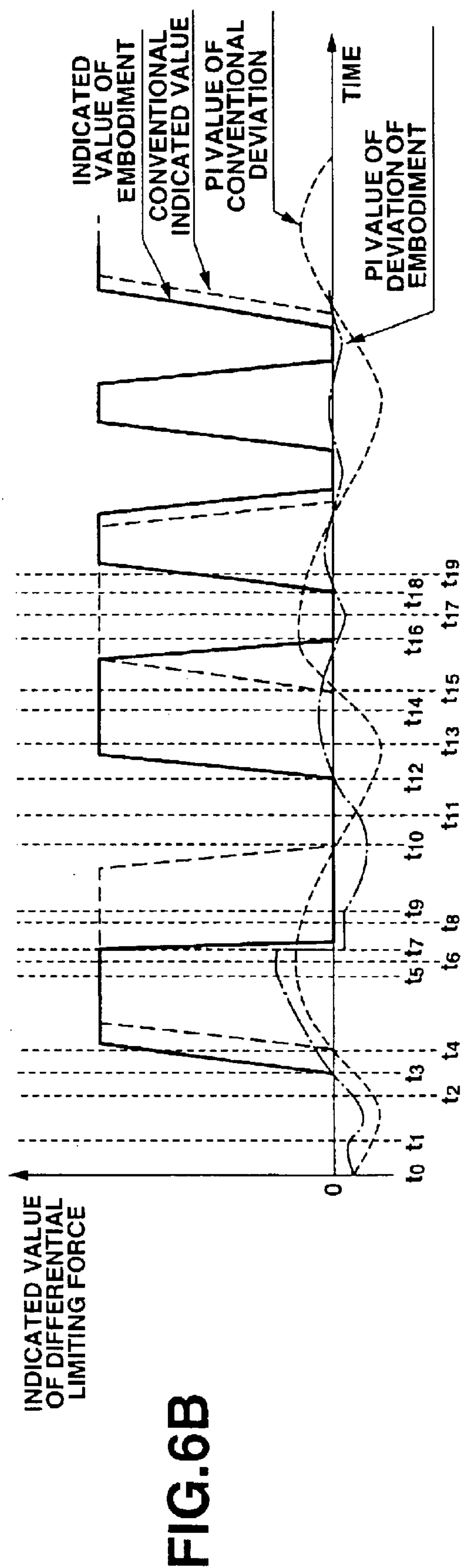

Further, the time chart of FIG. 6B shows the example of the PI value of a deviation set by the embodiment (dotted-and-dashed-line) and an example of the PI value according to the conventional control, rectangular solid lines show an example of the indicated value of a differential limiting force to the transfer clutch 21 set by the embodiment, and rectangular broken lines show an example of the indicated value of a differential limiting force to the transfer clutch 21 set by the conventional control.

First, since the actual difference in the rotational speed between the front and rear axle shafts $\Delta\omega ctr$ is smaller than the control start difference in the rotational speed between the front and rear axle shafts $\Delta\omega ctrs$ during a time t0–t1, the PI value of the deviation is set to a negative value which is proportional to the deviation in the embodiment because the integrated value of the deviation is reset to 0. In the conventional control, however, the PI value of the deviation is set to a larger negative value.

In the embodiment, the PI value of the deviation is kept to the negative value until the actual difference in rotational speed between the front and rear axle shafts $\Delta\omega ctr$ exceeds the control start difference in the rotational speed between the front and rear axle shafts $\Delta\omega ctrs$ at a time t1, and is set equal to the target difference in the rotational speed between the front and rear axle shafts $\Delta\omega ctrt$ at a time t2. In the conventional control, however, an integration is continued so that the PI value of the deviation is continuously set to the negative value.

Subsequently, in the embodiment, when the actual difference in the rotational speed between the front and rear axle shafts $\Delta\omega ctr$ exceeds the target difference in the rotational speed between the front and rear axle shafts $\Delta\omega ctrt$ at the time t2, the PI value of the deviation gradually decreases and shifts to a positive value at a time t3, and the indicated value of the differential limiting force is output to the transfer clutch 21. In contrast, in the conventional control, the PI value cannot shift to a positive value even at the time t3 because the PI value integrated is large at the time t2, and thus no indicated value of the differential limiting force is output to the transfer clutch 21. Thus, in the conventional control, the PI value integrated finally shifts to the positive value at a time t4 and the indicated value is output to the transfer clutch 21. As described above, the timing at which the conventional control is executed is delayed from the time t3 to the time t4 as compared with the embodiment.

When the indicated value is supplied to the transfer clutch 21, the actual difference in the rotational speed between the front and rear axle shafts $\Delta\omega ctr$ decreases and begins to fall (or decrease) below the target difference in the rotational speed between the front and rear axle shafts $\Delta\omega ctrt$ at a time t5 in the embodiment and at a time t6 in the conventional control.

In the embodiment, when the actual differential speed between the front and rear axle shafts $\Delta\omega ctr$ falls below the control start difference in the rotational speed between the front and rear axle shafts $\Delta\omega ctrs$ at a time t7, the integrated value is set to 0, the PI value is set to a negative value proportional to the deviation, and the indicated value of the differential limiting force to the transfer clutch 21 is also set to 0. Accordingly, the actual difference in the rotational speed between the front and rear axle shafts $\Delta\omega ctr$ in a decrease trend shifts to an increase trend and exceeds the control start difference in the rotational speed between the front and rear axle shafts $\Delta\omega ctrs$ at a time t9. Thus, the PI value begins to be integrated to the negative value again and continuously decreases until the actual difference in the rotational speed between the front and rear axle shafts $\Delta\omega ctr$ exceeds the target difference in the rotational speed between the front and rear axle shafts Δωctrt at a time t10.

In contrast, in the conventional control, when the actual difference in the rotational speed between the front and rear axle shafts Δωctr falls below the target difference in the rotational speed between the front and rear axle shafts Δωctrt at the time t6, the PI value gradually decreases. However, even if the actual difference is set to 0 at a time t8 and the transfer clutch 21 is engaged in the coefficient of a static friction, the indicated value of the differential limiting force is output to the transfer clutch 21. Then, the output of the indicated value of the differential limiting force is set to 0 for the first time at a time t10 at which the PI value is set to a negative value.

Thereafter, in the embodiment, when the actual difference exceeds the target difference at the time t10, the PI value gradually increases and is set to the positive value at a time t12, the indicated value of the differential limiting force is output to the transfer clutch 21, and the actual difference is caused to come close to the target difference. When the actual difference falls below the target difference at a time t14, the PI value gradually decreases and is set to the negative value at a time t16, the indicated value is set to 0, and the actual difference increases toward the target difference again. Thereafter, the repetition of the above control causes the actual difference to be stably converged toward the target difference.

In contrast, in the conventional control, the transfer clutch 21 finally begins a differential rotation at a time t11 after the time t10. However, the PI value decreases until a time t13 at which the actual difference exceeds the target difference. When the actual difference exceeds the target difference at the time t13, the PI value finally increases and is set to the positive value at a time t15, and the indicated value is output to the transfer clutch 21. This output causes the actual difference to decrease toward the target difference, and when the actual difference falls below the target difference at a time t17, the PI value decreases. At a time t19, the actual difference is set to 0 similarly at the time t8, whereby the transfer clutch 21 is engaged in the coefficient of the static friction.

As described above, it is difficult to perfectly prevent the stick-slip in the conventional control because the transfer clutch 21 is repeatedly engaged by the coefficient of the static friction and a coefficient of a dynamic friction. In contrast, in the embodiment, since the transfer clutch 21 is engaged only by the coefficient of the dynamic friction, the actual difference can be promptly converged toward the target difference, thereby the torque can be stably transmitted.

Next, the rear differential limiting control unit 50 will be described.

The rear differential limiting control unit 50 is also composed of a microcomputer and its peripheral circuit approximately similarly to the center differential limiting control unit 40 described above and mainly includes a vehicle speed calculation unit 50*a*, a calculation unit 50*b* for calculating an actual difference in a rotational speed between the rear right and left wheels, a setting unit 50*c* for setting a target difference in the rotational speed between the rear wheels, a calculation unit 50*d* for calculating a deviation of differences in a rotational speed between the rear wheels, a setting unit 50*e* for setting a control start difference in a rotational speed between the rear wheels, a determination unit 50*f* for determining a rear wheel control start condition, a calculation unit 50*g* for calculating a first differential limiting torque of the rear wheels, a calculation unit 50*h* for calculating a second differential limiting torque of the rear wheels, and a calculation unit 50*i* for calculating a differential limiting torque of the rear wheels, as shown in FIG. 7.

The vehicle speed calculation unit 50*a* is supplied with the wheel speeds ωfr, ωfl, ωrr, and ωrl of the respective wheels 14FR, 14FL, 14RR, and 14RL from the wheel speed sensors for the four wheels, that is, the respective wheel speed sensors 31FR, 31FL, 31RR, and 31RL, calculates the vehicle speed V by calculating, for example, an average value of the wheel speeds, and supplies the vehicle speed V to the setting units 50*c* and 50*e*.

The calculation unit 50*b* is supplied with the wheels speeds ωrr and ωrl of the rear right and left wheels 14RR and 14RL from the wheel speed sensors 31RR and 31RL and calculates the actual difference in the rotational speed between the rear right and left wheels 14RR and 14RL Δωrr by the following equation (6). That is, the calculation unit 50*b* is provided a means for detecting the actual difference in the rotational speed in a rear differential limiting control.

$$\Delta\omega rr = \omega rl - \omega rr| \quad (6)$$

The actual difference in the rotational speed between the rear right and left wheels 14RR and 14RL Δωrr calculated by the calculation unit 50*b* is supplied to the calculation unit 50*d* and the determination unit 50*f*.

The setting unit 50*c* is supplied with the vehicle speed V and sets the target difference in the rotational speed between the rear wheels Δωrrt according to the vehicle speed V with reference to the maps of the vehicle speed V and the target difference in the rotational speed between the rear wheels Δωrrt which are previously determined by the experiment, the calculation, and the like.

The maps of the vehicle speed V and the target difference in the rotational speed between the rear wheels Δωrrt are also set as shown in, for example, FIG. 3, and the target difference in the rotational speed between the rear wheels Δωrrt is previously set so as to gradually decrease as the vehicle speed V increases based on the specifications and the like of the automotive vehicle in view of various errors arisen in actual running conditions.

The target difference in the rotational speed between the rear wheels Δωrrt set by the setting unit 50*c* is supplied to the calculation unit 50*d*. That is, the setting unit 50*c* is provided as a means for setting the target difference in the rotational speed in the rear differential limiting control.

The calculation unit 50*d* is supplied with the actual difference in the rotational speed between the rear right and left wheels 14RR and 14RL Δωrr from the calculation unit 50*b* and with the target difference in the rotational speed between the rear wheels Δωrrt from the setting unit 50*c*, calculates the deviation therebetween (deviation of the differences between the rear wheels) err by the following equation (7), and supplies the deviation to the calculation units 50*g* and 50*h*.

$$\epsilon rr = \Delta\omega rr - \Delta\omega rrt \quad (7)$$

The setting unit 50*e* is supplied with the vehicle speed V from the vehicle speed calculation unit 50*a* and sets a control start difference in the rotational speed between the rear wheels Δωrrs according to the vehicle speed V referring to the maps of the vehicle speed V and the control start difference in the rotational speed between the rear wheels Δωrrs that are previously determined by, for example, the experiment, the calculation, and the like.

The control start difference in the rotational speed between the rear wheels Δωrrs is a value smaller than the target difference in the rotational speed between the rear wheels Δωrrt and set as a lower limit value of the actual difference in the rotational speed between the rear right and left wheels 14RR and 14RL Δωrr as described below. The maps of the vehicle speed V and the control start difference in the rotational speed between the rear wheels Δωrrs are set as shown in, for example, FIG. 3, and the control start difference in the rotational speed between the rear wheels Δωrrs is previously set so as to gradually decrease as the vehicle speed V increases based on the specifications and the like of the automotive vehicle in view of the various errors arisen in the actual running conditions.

Note that, in this embodiment, the setting unit 50*e* is supplied with a steering angle from the steering angle sensor 32 and can more accurately set the control start difference in the rotational speed between the rear wheels Δωrrs set according to the vehicle speed V by further correcting the speed by the steering angle. The correction made according to the steering angle is executed by the map having characteristics shown in, for example, FIG. 4, and the control start difference in the rotational speed between the rear wheels Δωrrs is corrected in a larger amount as the steering angle has a larger value.

Thus, the control start difference in the rotational speed between the rear wheels Δωrrs set by the setting unit 50*e* is supplied to the determination unit 50*f*. That is, the setting unit 50*e* is provided as a means for setting the lower limit value of the difference in the rotational speed in the rear differential limiting control.

The determination unit 50*f* is supplied with the actual difference in the rotational speed between the rear right and left wheels 14RR and 14RL Δωrr from the calculation unit 50*b* and with the control start difference in the rotational speed between the rear wheels Δωrrs from the setting unit 50*e* and determines whether or not a rear wheel control start condition is established by comparing thereof.

That is, when the actual difference in the rotational speed between the rear right and left wheels 14RR and 14RL Δωrr is larger than the control start difference in the rotational speed between the rear wheels Δωrrs, the determination unit 50*f* determines that the control start condition is established and supplies the result of a determination to the calculation units 50*g* and 50*h*.

The calculation unit 50*g* is supplied with the deviation of the differences in the rotational speed between the rear wheels ϵ rr from the calculation unit 50*d* and with the result of determination of the control start condition and calculates a first differential limiting torque of the rear wheels T smcrr as shown, for example, below.

$$s\ rr = \epsilon rr + k\ irr \cdot \neq (\epsilon rr) dt \quad (8)$$

(integration is executed from 0 to t)
where, k irr shows a gain of an integration term.

$$x = k\ wrr \cdot j\ wrr \cdot (d\epsilon rr/dt) + T\ sgrr \cdot (s\ rr/(|s\ rr| + \delta rr)) \quad (9)$$

where, k wrr shows the gain of the differential term, j wrr shows an inertia term, T sgrr shows a switching gain, and δrr shows a constant for making a differential limiting force continuous to prevent chattering.

When x>0, the first differential limiting torque of the rear wheels T smcrr is set to x, whereas when x≦0, it is set to 0. When Δωrr Δωrrs and thus the control start condition is not established by referring to the result of the determination of the control start condition supplied from the determination unit 50*f*, T smcrr is set to 0 even if T smcrr=x as well as ∫(ϵrr)dt=0 is reset (the integration is executed from 0 to t).

That is, when the actual difference in the rotational speed between the rear right and left wheels 14RR and 14RL Δωrr is smaller than the control start difference in the rotational speed between the rear wheels Δωrrs that is the lower limit value, the first differential limiting torque of the rear wheels T smcrr is set to 0 to prevent a rear differential clutch 23 from being locked by the coefficient of the static friction. Further, the integral term ∫(ϵrr)dt=0 is reset (the integration is executed from 0 to t) in order to effectively prevent that the integral term is set to an abnormally low value, the control of the rear differential clutch 23 is delayed when the wheels Δωrrs actually begin to slip again, and the stick-slip of the clutch is promoted. The first differential limiting torque of the rear wheels T smcrr calculated as described above is supplied to the calculation unit 50*i*.

The calculation unit 50*h* is supplied with the deviation of the differences in rotational speed between the rear wheels ϵ rr and with the result of the determination of the control start condition and calculates a second differential limiting torque of the rear wheels T pcrr as shown, for example, below.

That is, when the deviation of the differences in rotational speed between the rear wheels ϵ rr is larger than 0, the second differential limiting torque of the rear wheels T pcrr is set to k prr·ϵrr, whereas when it is smaller than 0, the second differential limiting torque of the rear wheels T pcrr is set to 0. Here, k prr shows the gain of the proportional term. When Δωrr≦Δωrrs and thus the control start condition is not established as referring to the result of determination of the control start condition supplied from the determination unit 50*f*, T pcrr is set to 0 even if T pcrr=k prr Err, thereby the rear differential clutch 23 is prevented from being locked by the coefficient of the static friction. The second differential limiting torque of the rear wheels T pcrr calculated as described above is supplied to the calculation unit 50*i*.

The calculation unit 50*i* is supplied with the first differential limiting torque of the rear wheels T smcrr and with the second differential limiting torque of the rear wheels T pcrr, calculates a final differential limiting torque of the rear wheels T lsdrr, and supplies the indicated value of a differential limiting force according to the final differential limiting torque of the rear wheels T lsdrr to the rear differential clutch drive unit 51.

$$T\ lsdrr = T\ smcrr + T\ pcrr \quad (10)$$

As described above, in this embodiment, differential limiting torque setting means is composed of the calculation unit 50*d* for calculating the deviation of the differences in the rotational speed between the rear wheels, the determination unit 50*f* for determining the rear wheel control start condition, the calculation unit 50*g* for calculating the first differential limiting torque of the rear wheels 14RL, 14RR, the calculation unit 50*h* for calculating the second differential limiting torque of the rear wheels, and the calculation unit 50*i* for calculating the differential limiting torque of the rear wheels.

Next, a flow of a process executed by the rear differential limiting control unit 50 will be described with reference to the flowchart of FIG. 8.

First, at S201, necessary parameters such as the wheel speeds ωfr, ωfl, ωrr, and ωrl of the respective wheels 14FR, 14FL, 14RR, and 14RL, a steering angle, and the like are read.

Then, the process goes to S202 at which the vehicle speed calculation unit 50*a* calculates the vehicle speed V, and the process goes to S203 at which the setting unit 50*c* sets the target difference in the rotational speed between the rear wheels $\Delta\omega rrt$ according to the vehicle speed V with reference to the maps of the vehicle speed V and the target difference in the rotational speed between the rear wheels $\Delta\omega rrt$.

Next, the process goes to S204 at which the setting unit 50*e* sets the control start difference in the rotational speed between the rear wheels $\Delta\omega rrs$ with reference to the maps of the vehicle speed V and the control start difference in the rotational speed between the rear wheels $\Delta\omega rrs$ by making correction by using the steering angle.

Next, the process goes to S205 at which the calculation unit 50*b* calculates the actual difference in the rotational speed between the rear right and left wheels 14RR and 14RL $\Delta\omega rr$ based on the equation (6).

Thereafter, when the process goes to S206, the determination unit 50*f* compares the actual difference in the rotational speed between the rear right and left wheels 14RR and 14RL $\Delta\omega rr$ with the control start difference in the rotational speed between the rear wheels $\Delta\omega rrs$. When the actual difference in the rotational speed between the rear right and left wheels 14RR and 14RL $\Delta\omega rr$ is larger than the control start difference in the rotational speed between the rear wheels $\Delta\omega rrs$, the determination unit 50*f* determines that the rear wheel control condition is established, and the process goes to S207.

At S207, the calculation unit 50*d* calculates the deviation of the differences in the rotational speed between the rear wheels err by the equation (7), and the process goes to S208.

At S208, the calculation unit 50*g* calculates the integrated value of the deviation of the differences in the rotational speed between the rear wheels err, that is, calculates $\int(\epsilon rr)$ dt (integration is executed from 0 to t). Then, the process goes to S209 at which the calculation unit 50*g* calculates the first differential limiting torque of the rear wheels T smcrr. The calculation of the first differential limiting torque of the rear wheels T smcrr depends upon the value of x calculated by the equation (9). When $x>0$, the first differential limiting torque of the rear wheels T smcrr is set to x, whereas when $x\leqq 0$, it is set to 0.

Next, the process goes to S210 at which the calculation unit 50*h* calculates the second differential limiting torque of the rear wheels T pcrr. Specifically, when the deviation of the differences in the rotational speed between the rear wheels err is larger than 0, the second differential limiting torque of the rear wheels T pcrr is set to k $prr\leqq\epsilon rr$, whereas when the second differential limiting torque is smaller than 0, the second differential limiting torque of the rear wheels T pcrr is set to 0.

Next, the process goes to S211 at which the calculation unit 50*i* calculates the sum of the first differential limiting torque of the rear wheels T smcrr and the second differential limiting torque of the rear wheels T pcrr according to the equation (10) and determines the final differential limiting torque of the rear wheels T lsdrr. Then, the process goes to S212 at which the indicated value of the differential control force according to the final differential limiting torque of the rear wheels T lsdrr is output to the rear differential clutch drive unit 51, and the program is finished.

In contrast, when the actual difference in the rotational speed between the rear right and left wheels 14RR and 14RL $\Delta\omega rr$ is smaller than the control start difference in the rotational speed between the rear wheels $\Delta\omega rrs$ in the determination at S206, it is determined that the rear wheel control start condition is not established, and the process goes to S213.

At S213, the first differential limiting torque of the rear wheels T smcrr, the second differential limiting torque of the rear wheels T pcrr, and the final differential limiting torque of the rear wheels T lsdrr are set to 0.

Thereafter, the process goes to S214 at which the calculation unit 50*g* resets the integrated value of the deviation of the differences in the rotational speed between the rear wheels err to 0, and the process goes to S212 and finishes the program.

As described above, in the embodiment, since the rear differential clutch 23 is engaged only by the coefficient of the dynamic friction, the actual difference in the rotational speed between the rear wheels $\Delta\omega rr$ can be promptly converged toward the target difference in the rotational speed between the rear wheels $\Delta\omega rrt$ similarly to the transfer clutch 21 described above, thereby torque can be stably transmitted.

Next, the front differential limiting control unit 60 will be described.

The front differential limiting control unit 60 is also composed of a microcomputer and its peripheral circuit approximately similarly to the rear differential limiting control unit 50 described above and mainly includes a vehicle speed calculation unit 60*a*, a calculation unit 60*b* for calculating an actual difference in a rotational speed between front right and left wheels, a first setting unit 60*c* for setting a target difference in the rotational speed between the front wheels, a first calculation unit 60*d* for calculating a deviation of differences in the rotational speed between the front wheels, a second setting unit 60*e* for setting a control start difference in the rotational speed between the front wheels, a determination unit 60*f* for determining a front wheel control start condition, a second calculation unit 60*g* for calculating a first differential limiting torque of the front wheels, a third calculation unit 60*h* for calculating a second differential limiting torque of the front wheels, and a fourth calculation unit 60*i* for calculating the differential limiting torque of the front wheels, as shown in FIG. 9.

The vehicle speed calculation unit 60*a* is supplied with the wheel speeds $\Delta\omega fr$, $\Delta\omega fl$, $\Delta\omega rr$, and $\Delta\omega rl$ of the respective wheels 14FR, 14FL, 14RR, and 14RL from the wheel speed sensors for the four wheels, that is, the respective wheel speed sensors 31FR, 31FL, 31RR, and 31RL, calculates the vehicle speed v by calculating, for example, the average value of these wheel speeds, and supplies the vehicle speed V to the setting units 60*c* and 60*e*.

The calculation unit 60*b* is supplied with the wheels speeds $\omega fr$ and $\omega fl$ from the wheel speed sensors 31FR and 31FL and calculates the actual difference in the rotational speed between the front right and left wheels 14FR and 14FL $\Delta\omega ft$ by the following equation (11). That is, the calculation unit 60*b* is provided as a means for detecting the actual difference in the rotational speed in a front differential limiting control.

$$\Delta\omega ft=|\omega fl-\omega fr| \tag{11}$$

The actual difference in the rotational speed between the front right and left wheels 14FR and 14FL $\Delta\omega ft$ calculated by the calculation unit 60*b* is supplied to the calculation unit 60*d* and the determination unit 60*f*.

The first setting unit 60*c* is supplied with the vehicle speed V from the vehicle speed calculation unit 60*a* and sets a target difference in the rotational speed between the front wheels $\Delta\omega ftt$ according to the vehicle speed V with reference to the maps of the vehicle speed V and the target difference in the rotational speed between the front wheels $\Delta\omega ftt$ which are previously determined by the experiment, the calculation, and the like.

The maps of the vehicle speed V and the target difference in the rotational speed between the front wheels $\Delta\omega ftt$ are also set as shown in, for example, FIG. 3, and the target difference in the rotational speed between the front wheels Δωftt is previously set so as to gradually decrease as the vehicle speed V increases based on the specifications and the like of the automotive vehicle in view of the various errors arisen in the actual running conditions.

The target difference in the rotational speed between the front wheels Δωftt set by the first setting unit 60*c* is supplied to the calculation unit 60*d*. That is, the first setting unit 60*c* is provided as the means for setting the target difference in the rotational speed in the front differential limiting control.

The first calculation unit 60*d* is supplied with the actual difference in the rotational speed between the front right and left wheels 14FR and 14FL Δωft from the calculation unit 60*b* and with the target difference in the rotational speed between the front wheels Δωftt from the first setting unit 60*c*, calculates the deviation therebetween (the deviation of the differences between the front wheels) εft by the following equation (12), and supplies the deviation to the calculation units 50*g* and 50*h*.

$$\epsilon ft=\Delta\omega ft-\Delta\omega ftt \quad (12)$$

The second setting unit 60*e* is supplied with the vehicle speed V and sets a control start difference in the rotational speed between the front wheels Δωfts according to the vehicle speed V by referring to, for example, the maps of the vehicle speed V and control start difference in the rotational speed between the front wheels Δωfts previously determined by the experiment, the calculation, and the like.

The control start difference in the rotational speed between the front wheels Δωfts is a smaller value than the target difference in the rotational speed between the front wheels Δωftt and set as a lower limit value of the actual difference in the rotational speed between the front right and left wheels 14FR and 14FL Δωft as described below. The maps of the vehicle speed V and the control start difference in the rotational speed between the front wheels Δωfts are set as shown in, for example, FIG. 3, and the control start difference in the rotational speed between the front wheels Δωfts is previously set so as to gradually decrease as the vehicle speed V increases based on the specifications and the like of the automotive vehicle in view of the various errors arisen in the actual running conditions.

Note that, in this embodiment, the second setting unit 60*e* is supplied with the steering angle from the steering angle sensor 32 and can more accurately set the control start difference in the rotational speed between the front wheels Δωfts set according to the vehicle speed V by further correcting the vehicle speed V by the steering angle. The correction made according to the steering angle is executed by a map having characteristics shown in, for example, FIG. 4, and the control start difference in the rotational speed between the front wheels Δωfts is corrected in a larger amount as the steering angle has the larger value.

Thus, the control start difference in the rotational speed between the front wheels Δωfts set by the second setting unit 60*e* is supplied to the determination unit 60*f*. That is, the second setting unit 60*e* is provided as a means for setting the lower limit value of the difference in the rotational speed in the front differential limiting control.

The determination unit 60*f* is supplied with the actual difference in the rotational speed between the front right and left wheels 14FR and 14FL Δωft from the calculation unit 60*b* and with the control start difference in the rotational speed between the front wheels Δωfts from the second setting unit 60*e* and determines whether or not a front wheel control start condition is established by comparing thereof.

That is, when the actual difference in the rotational speed between the front right and left wheels 14FR and 14FL Δωft is larger than the control start difference in the rotational speed between the front wheels Δωfts, the determination unit 60*f* determines that the control start condition is established and supplies the result of the determination to the second and third calculation units 60*g* and 60*h*.

The second calculation unit 60*g* is supplied with the deviation of the differences in the rotational speed between the front wheels εft from the first calculation unit 60*d* and with the result of the determination of the control start condition from the determination unit 60*f* and calculates a first differential limiting torque of the front wheels T smcft as shown below.

$$s\ ft=\epsilon ft+k\ ift\cdot\int(\epsilon ft)dt \quad (13)$$

(the integration is executed from 0 to t)
where, k ift shows a gain of an integral term.

$$x=k\ wft\cdot j\ wft\cdot(d\epsilon ft/dt)+T\ sgft\cdot(s\ ft/(|s\ ft|+\delta ft)) \quad (14)$$

where, k wft shows a gain of a differential term, j wft shows an inertia term, T sgft shows a switching gain, and δft shows a constant for making a differential limiting force which is continuous to prevent chattering.

When x>0, the first differential limiting torque of the front wheels T smcft is set to x, whereas when x≦0, it is set to 0. When Δωft≦Δωfts and thus the control start condition is not established as referring to the result of determination of the control start condition supplied from the determination unit 60*f*, T smcft is set to 0 even if T smcfr=x as well as ∫(εft)dt=0 is reset (the integration is executed from 0 to t).

That is, when the actual difference in the rotational speed between the front right and left wheels 14FR and 14FL Δωft is smaller than the control start difference in the rotational speed between the front wheels Δωfts that is the lower limit value, the first differential limiting torque of the front wheels T smcft is set to 0 to prevent a front differential clutch 27 from being locked in the coefficient of the static friction. Further, the integral term ∫(εft)dt=0 (the integration is executed from 0 to t) is reset in order to effectively prevent that the integral term is set to an abnormally low value, the control of the front differential clutch 27 is delayed when the clutch 27 actually begins to slip again, and the stick-slip of the clutch 27 is promoted. The first differential limiting torque of the front wheels T smcft calculated as described above is supplied to the calculation unit 60*i*.

The fourth calculation unit 60*h* is supplied with the deviation of the differences in the rotational speed between the front wheels eft from the first calculation unit 60*d* and with the result of the determination of the control start condition from the determination unit 60*f* and calculates second differential limiting torque of the front wheels T pcft as shown, for example, below.

That is, when the deviation of the differences in the rotational speed between the front wheels eft is larger than 0, the second differential limiting torque of the front wheels T pcft is set to k pft≦εft, whereas when the torque is smaller than 0, the second differential limiting torque of the front wheels T pcft is set to 0. Here, k pft shows a gain of a proportional term. When Δωft≦Δωfts is established and thus the control start condition is not established referring to the result of determination of the control start condition supplied from the determination unit 60*f*, T pcft is set to 0 even if T pcft=k pft≦εft, thereby the front differential clutch 27 is prevented from being locked by the coefficient of the static friction. The second differential limiting torque of the front wheels T pcft calculated as described above is supplied to the calculation unit 60*i*.

The fourth calculation unit 60*i* is supplied with the first differential limiting torque of the front wheels T smcft from the second calculation unit 60*g* and with the second differential limiting torque of the front wheels T pcft from the third calculation unit 60*h*, calculates a final differential limiting torque of the front wheels T lsdft, and supplies the indicated value of the differential limiting force according to the final differential limiting torque of the front wheels T lsdft to the front differential clutch drive unit 61.

$$T\ lsdft = T\ smcft + T\ pcft \quad (15)$$

As described above, in this embodiment, a differential limiting torque setting means is composed of the first calculation unit 60*d* for calculating the deviation of the differences in the rotational speed between the front wheels, the determination unit 60*f* for determining the front wheel control start condition, the second calculation unit 60*g* for calculating the first differential limiting torque of the front wheels, the third calculation unit 60*h* for calculating the second differential limiting torque of the front wheels, and the fourth calculation unit 60*i* for calculating the differential limiting torque of the front wheels 14FL, 14FR.

Figure 10:
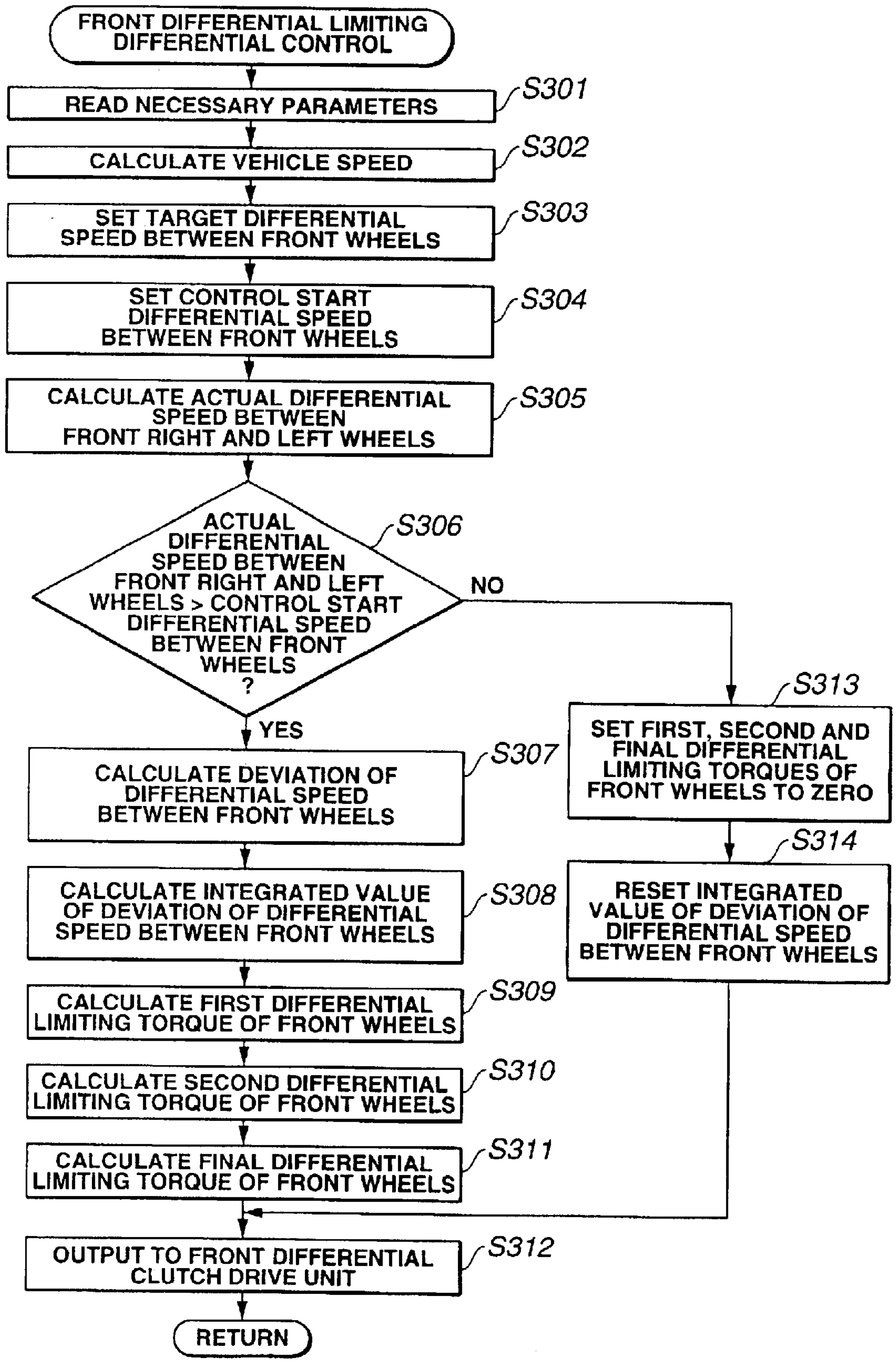
FIG. 10 is the flowchart of a front differential limiting control program.

Next, the flow of the process executed by the front differential limiting control unit 60 will be described with reference to the flowchart of FIG. 10.

First, at S301, the necessary parameters such as the wheel speeds ωfr, ωfl, ωrr, and ωrl of the respective wheels 14FR, 14FL, 14RR, and 14RL, the steering angle, and the like are read.

Next, the process goes to S302 at which the vehicle speed calculation unit 60*a* calculates the vehicle speed V, the process goes to S303 at which the first setting unit 60*c* sets the target difference in the rotational speed between the front wheels Δωftt according to the vehicle speed V with reference to the maps of the vehicle speed V and the target difference in the rotational speed between the front wheels Δωftt.

Next, the process goes to S304 at which the second setting unit 60*e* sets the control start difference in the rotational speed between the front wheels Δωfts with reference to the maps of the vehicle speed V and the control start difference in the rotational speed between the front wheels Δωfts by making correction by using the steering angle.

Next, the process goes to S305 at which the calculation unit 60*b* calculates the actual difference in the rotational speed between the front right and left wheels 14FR and 14FL Δωft based on the equation (11).

Thereafter, when the process goes to S306, the determination unit 60*f* compares the actual difference in the rotational speed between the front right and left wheels 14FR and 14FL Δωft with the control start difference in the rotational speed between the front wheels Δωfts. When the actual difference in the rotational speed between the front right and left wheels 14FR and 14FL Δωft is larger than the control start difference in the rotational speed between the front wheels Δωfts, the determination unit 60*f* determines that the front wheel control condition is established, and the process goes to S307.

At S307, the first calculation unit 60*d* calculates the deviation of the differences in the rotational speed between the front wheels εft by the equation (12), and the process goes to S308.

At S308, the second calculation unit 60*g* calculates the integrated value of the deviation of the differences in the rotational speed between the front wheels εft, that is, calculates $\int(\epsilon ft)dt$ (integration is executed from 0 to t). Then, the process goes to S309 at which the second calculation unit 60*g* calculates the first differential limiting torque of the front wheels T smcft. The calculation of the first differential limiting torque of the front wheels T smcft depends upon the value of x calculated by the equation (14). When x>0, the first differential limiting torque of the front wheels T smcft is set to x, whereas when x>0, the torque is set to 0.

Next, the process goes to S310 at which the third calculation unit 60*h* calculates the second differential limiting torque of the front wheels T pcft. Specifically, when the deviation of the differences in the rotational speed between the front wheels εft is larger than 0, the second differential limiting torque of the front wheels T pcft is set to k pft·εft, whereas when it is smaller than 0, the second differential limiting torque of the front wheels T pcft is set to 0.

Next, the process goes to S311 at which the fourth calculation unit 60*i* calculates the sum of the first differential limiting torque of the front wheels T smcft and the second differential limiting torque of the front wheels T pcft according to the equation (15) and determines the final differential limiting torque of the front wheels T lsdft. Then, the process goes to S312 at which the indicated value of the differential control force according to the final differential limiting torque of the front wheels T lsdft is output to the front differential clutch drive unit 61, and a program is finished.

In contrast, when the actual difference in the rotational speed between the front right and left wheels 14FR and 14FL Δωft is smaller than the control start difference in the rotational speed between the front wheels Δωfts in the determination at S306, it is determined that the front wheel control start condition is not established, and the process goes to S313.

At S313, the first differential limiting torque of the front wheels T smcft, the second differential limiting torque of the front wheels T pcft, and the final differential limiting torque of the front wheels T lsdft are set to 0.

Thereafter, the process goes to S314 at which the second calculation unit 60*g* resets the integrated value of the deviation of the differences in the rotational speed between the front wheels εft to 0, and the process goes to S312 and finishes the program.

As described above, in the embodiment, since the front differential clutch 27 is engaged only by the coefficient of the dynamic friction, the actual difference in the rotational speed between the front right and left wheels 14FR and 14FL Δωft can be promptly converged toward the target difference in the rotational speed between the front wheels Δωftt, thereby the torque can be stably transmitted.

As described above, according to the present invention, the torque can be stably transmitted by using only a state of the engagement in the coefficient of the dynamic friction by preventing the clutch element from being locked in the coefficient of the static friction as much as possible even if a delay is caused in the control system, thereby the occurrence of the unpleasant noise and vibration due to the stick-slip of the clutch elements can be prevented.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A driving force transmission control system for vehicle for transmitting a driving force from one of drive shafts to the other thereof through clutch means comprising:

first means for setting a target difference in a rotational speed between the drive shaft and the other drive shaft according to running states of the vehicle;

second means for detecting an actual difference in said rotational speed;

third means for setting a lower limit value of a difference in said rotational speed between the drive shafts; and differential limiting torque setting means for calculating an engaging torque of the clutch means according to the target difference and the actual difference and setting the engaging torque to approximately 0 when at least the actual difference is smaller than the lower limit value.

2. The driving force transmission control system according to claim 1, wherein the clutch means is interposed between said drive shafts.

3. The driving force transmission control system according to claim 2, wherein:

the differential limiting torque setting means sets the integral term to 0 when at least the actual difference in said rotational speed is smaller than the lower limit value of the difference in said rotational speed when the differential limiting torque setting means employs an integral term representative of an amount of a control based on a past history of a deviation of said control previously recorded.

4. The driving force transmission control system according to claim 2, wherein:

the first means for setting the lower limit value of the difference in said rotational speed sets the lower limit value according to at least one of a vehicle speed and a steering angle.

5. The driving force transmission control system according to claim 3, wherein:

the second means for setting the lower limit value of the difference in said rotational speed sets the lower limit value according to at least one of said vehicle speed and said steering angle.

6. The driving force transmission control system according to claim 1, wherein:

the clutch means is interposed between a right wheel and a left wheel of at least one of the front wheels and the rear wheels.

7. The driving force transmission control system according to claim 6, wherein:

the differential limiting torque setting means sets the integral term to 0 when at least the actual difference in said rotational speed is smaller than the lower limit value of the difference in said rotational speed, when the differential limiting torque setting means employs an integral term representative of an amount of control based on the past history.

8. The driving force transmission control system according to claim 6, wherein:

the second means for setting the lower limit value of the difference in the rotational speed sets the lower limit value according to at least one of said vehicle speed and said steering angle.

9. The driving force transmission control system according to claim 7, wherein:

the third means for setting the lower limit value of the difference in said rotational speed sets the lower limit value according to at least one of said vehicle speed and said steering angle.

10. The driving force transmission control system according to claim 1, wherein:

the differential limiting torque setting means sets the integral term to 0 when at least the actual difference in said rotational speed is smaller than the lower limit value of the difference in said rotational speed when the differential limiting torque setting means employs said integral term representative of said amount of control based on the past history.

11. The driving force transmission control system according to claim 1, wherein:

the third means for setting the lower limit value of the difference in said rotational speed sets the lower limit value according to at least one of said vehicle speed and said steering angle.

12. The driving force transmission control system according to claim 10, wherein:

the third means for setting the lower limit value of the difference in said rotational speed sets the lower limit value according to at least one of said vehicle speed and said steering angle.

13. A method for transmitting a driving force from one of drive shafts to the other thereof through clutch means in a driving force transmission control for vehicle, the method comprising the steps of:

setting a target difference in a rotational speed between the drive shaft and the other drive shaft according to running states of the vehicle;

detecting an actual difference in said rotational speed;

setting a lower limit value of a difference in said rotational speed between the drive shafts; and calculating an engaging torque of the clutch means according to the target difference and the actual difference and setting the engaging torque to approximately 0 when at least the actual difference is smaller than the lower limit value.

* * * * *